US012530645B2

(12) United States Patent
Patti et al.

(10) Patent No.: US 12,530,645 B2
(45) Date of Patent: Jan. 20, 2026

(54) COLLABORATIVE RUNBOOK EXECUTION

(71) Applicant: Oracle International Corporation, Redwood Shores, CA (US)

(72) Inventors: Raghu Hanumanth Reddy Patti, San Bruno, CA (US); Christopher A. Roy, Amherst, NH (US); Ana Maria Hernandez McCollum, Belmont, CA (US); Manas Goswami, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 192 days.

(21) Appl. No.: 17/733,647

(22) Filed: Apr. 29, 2022

(65) Prior Publication Data
US 2023/0062439 A1    Mar. 2, 2023

Related U.S. Application Data

(60) Provisional application No. 63/261,832, filed on Sep. 29, 2021, provisional application No. 63/236,563,
(Continued)

(51) Int. Cl.
*G06Q 10/0631*    (2023.01)
*G06F 11/07*    (2006.01)
(Continued)

(52) U.S. Cl.
CPC ... *G06Q 10/06316* (2013.01); *G06F 11/3051* (2013.01); *G06Q 10/0633* (2013.01);
(Continued)

(58) Field of Classification Search
None
See application file for complete search history.

(56) References Cited

U.S. PATENT DOCUMENTS 1,167,760 A    1/1916    Jones
8,533,608 B1 *    9/2013    Tantiprasut ............ G06Q 10/06
                                                              715/751
(Continued)

FOREIGN PATENT DOCUMENTS

WO    2015/065356 A1    5/2015

OTHER PUBLICATIONS

"Assigning System Center Orchestrator Runbooks Permissions", Retrieved at https://docs.flexera.com/appportal2017/Content/helplibrary/AP_ConnectMSOrch.htm, Retrieved on May 2022, 2 Pages.
(Continued)

*Primary Examiner* — Folashade Anderson
(74) *Attorney, Agent, or Firm* — Invoke

(57) ABSTRACT

Techniques for collaboratively executing runbook sessions are disclosed. A system provides for collaborative completion of runbook operations by delegating runbook operations or by transferring ownership of a runbook from one user to another. A system identifies a first set of runbook operations capable of being completed by a first user. The system identifies a second set of runbook operations that are not capable of being completed by the first user. The system identifies a second user capable of completing the second set of runbook operations. Upon completion of the first set of runbook operations by the first user, the system determines whether to delegate the second set of runbook operations to the second user or to transfer ownership of the runbook session to the second user. The system determines that the runbook session is completed based on the combined results collaboratively generated by the initial user and the alternate user.

18 Claims, 6 Drawing Sheets

Related U.S. Application Data filed on Aug. 24, 2021, provisional application No. 63/236,561, filed on Aug. 24, 2021, provisional application No. 63/236,557, filed on Aug. 24, 2021, provisional application No. 63/236,565, filed on Aug. 24, 2021.

(51) Int. Cl.
*G06F 11/30* (2006.01)
*G06Q 10/0633* (2023.01)
*G06Q 10/0637* (2023.01)
*G06Q 10/10* (2023.01)
*G06Q 10/20* (2023.01)
*G06F 11/34* (2006.01)

(52) U.S. Cl.
CPC ....... *G06Q 10/0637* (2013.01); *G06Q 10/103* (2013.01); *G06Q 10/20* (2013.01); *G06F 11/079* (2013.01); *G06F 11/0793* (2013.01); *G06F 11/3065* (2013.01); *G06F 11/3438* (2013.01); *G06F 2201/86* (2013.01)

(56) References Cited

U.S. PATENT DOCUMENTS

| | | | |
|---|---|---|---|
| 8,713,436 B2 | 4/2014 | Cheng et al. | |
| 8,767,593 B1* | 7/2014 | Allen | 370/263 |
| 9,164,965 B2 | 10/2015 | Molesky et al. | |
| 9,819,547 B2 | 11/2017 | Maini et al. | |
| 9,891,971 B1 | 2/2018 | Kuhhirte | |
| 10,120,552 B2 | 11/2018 | King et al. | |
| 10,284,437 B2 | 5/2019 | Scallan et al. | |
| 10,379,990 B2 | 8/2019 | Krishnamoorthy et al. | |
| 10,671,263 B2* | 6/2020 | King | G06F 40/117 |
| 10,678,610 B2 | 6/2020 | Ebrahimi et al. | |
| 10,769,043 B2 | 9/2020 | Sabharwal et al. | |
| 10,866,872 B1 | 12/2020 | Gudka et al. | |
| 10,878,042 B2 | 12/2020 | Busch et al. | |
| 10,922,493 B1 | 2/2021 | Das et al. | |
| 10,970,632 B2 | 4/2021 | Sabharwal et al. | |
| 10,999,164 B1 | 5/2021 | Sridhar et al. | |
| 11,074,512 B1 | 7/2021 | Forte et al. | |
| 11,080,121 B2 | 8/2021 | Thornhill et al. | |
| 11,550,652 B1 | 1/2023 | Arora et al. | |
| 11,704,474 B2* | 7/2023 | Huang | G06F 40/14 715/234 |
| 2005/0223285 A1 | 10/2005 | Faihe et al. | |
| 2012/0303772 A1* | 11/2012 | Ennis | G06N 5/02 709/223 |
| 2013/0090996 A1 | 4/2013 | Stark | |
| 2013/0103973 A1 | 4/2013 | Werth et al. | |
| 2015/0142825 A1 | 5/2015 | Deshmukh et al. | |
| 2015/0188768 A1 | 7/2015 | Maini et al. | |
| 2017/0061338 A1* | 3/2017 | Mack | G06Q 10/0637 |
| 2017/0090736 A1 | 3/2017 | King et al. | |
| 2017/0093874 A1* | 3/2017 | Uthe | G06F 3/0482 |
| 2018/0091528 A1 | 3/2018 | Shahbaz et al. | |
| 2018/0356970 A1* | 12/2018 | King | G06F 3/04847 |
| 2019/0230003 A1* | 7/2019 | Gao | H04L 41/0853 |
| 2019/0391892 A1 | 12/2019 | Sabharwal et al. | |
| 2019/0392310 A1 | 12/2019 | Sabharwal et al. | |
| 2020/0004618 A1 | 1/2020 | Thornhill et al. | |
| 2020/0136928 A1 | 4/2020 | Sethi et al. | |
| 2020/0167255 A1 | 5/2020 | Gudka et al. | |
| 2020/0204428 A1 | 6/2020 | Sasidharan et al. | |
| 2021/0191769 A1 | 6/2021 | Eschinger et al. | |
| 2021/0279160 A1* | 9/2021 | Huang | G06F 3/0483 |
| 2021/0333953 A1 | 10/2021 | Fitzgerald et al. | |
| 2022/0067620 A1 | 3/2022 | Thornhil et al. | |
| 2022/0342796 A1 | 10/2022 | Cui et al. | |
| 2022/0414571 A1 | 12/2022 | Buggins et al. | |
| 2023/0034173 A1 | 2/2023 | Russell et al. | |
| 2023/0062588 A1 | 3/2023 | Patti et al. | |
| 2023/0068096 A1* | 3/2023 | Patti | G06F 9/4881 |
| 2024/0012917 A1* | 1/2024 | Milito | G06F 21/604 |
| 2024/0280973 A1* | 8/2024 | Nalam | G05B 19/4188 |
| 2024/0348664 A1* | 10/2024 | Mohanram | H04L 63/02 |
| 2025/0231829 A1* | 7/2025 | Muthukrishnan | G06F 11/079 |

OTHER PUBLICATIONS

"Automation Hybrid Runbook Worker overview", Retrieved at https://docs.microsoft.com/en-us/azure/automation/automation-hybrid-runbook-worker, Retrieved on Apr. 29, 2022, 11 Pages.

"AWS Systems Manager Automation", Retrieved at https://docs.aws.amazon.com/systems-manager/latest/userguide/systems-manager-automation.html, Retrieved at May 2022, 4 Pages.

"Build & Run Remediation Runbook", Retrieved at https://wellarchitectedlabs.com/operational-excellence/200_labs/200_automating_operations_with_playbooks_and_runbooks/4_build_run_remediation_runbook/, Retrieved on May 2022, 9 Pages.

"Complex deployments made easy", Retrieved at https://octopus.com/, Retrieved on May 2022, 6 Pages.

"Configure runbook output and message streams", Retrieved at https://docs.microsoft.com/en-us/azure/automation/automation-runbook-output-and-messages, Jul. 10, 2021, 17 Pages.

"Datasheet-NetBrain-Integrated-Edition-7.0", Retrieved at https://www.netbraintech.com/wp-content/uploads/2017/09/Datasheet-NetBrain-Integrated-Edition-7.0.pdf, Retrieved at May 2022, 2 Pages.

"DRYiCE iAutomate v5.0", Retrieved at https://www.dryice.ai/releases/dryice-iautomate-v50, Retrieved on May 2020, 7 Pages.

"DRYiCE iAutomate" Retrieved at https://www.dryice.ai/resource/brochure/dryice-iautomate, Retrieved on May 2022, 2 Pages.

"DRYiCE iAutomate", Retrieved at https://www.dryice.ai/products-and-platforms/iautomate, Retrieved on May 2022, 7 Pages.

"Evolution of Artificial Intelligence for IT Operations", Retrieved at https://www.siliconindia.com/viewpoints/cxoinsights/evolution-of-artificial-intelligence-for-it-operations-nwid-10000.html, Retrieved on May 2022, 4 Pages.

"HCL Hero—Workload Automation", Retrieved at https://solutions.hcldoc.com/HCL_HERO/ISSLI/Responsive_HTML5/Overview/Product_Overview.htm, Retrieved on May 2022, 2 Pages.

"How a Simple Misconfiguration Can Ruin Everyone's Day—NetBrain", Retrieved at https://www.netbraintech.com/blog/human-error-the-forgotten-single-point-of-failure/, Apr. 28, 2017, 7 Pages.

"IBM Runbook Automation and IBM Alert Notification deliver more agile, automated operations management", Retrieved at https://www.ibm.com/common/ssi/ShowDoc.wss?docURL=/common/ssi/rep_ca/1/897/ENUS216-031/index.html, Feb. 16, 2016, 16 Pages.

"IBM Runbook Automation Guide", Retrieved at https://webcache.googleusercontent.com/search?q=cache:jZ5yusTVFAEJ:https://www.ibm.com/support/knowledgecenter/SSZQDR/com.ibm.rba.doc/rba_pdf_guide.pdf+&cd=11&hl=en&ct=clnk&gl=in, Retrieved on May 2022, 138 Pages.

"Manage role permissions and security in Automation", Retrieved at https://docs.microsoft.com/en-us/azure/automation/automation-role-based-access-control, Sep. 26, 2021, 30 Pages.

"Microsoft Azure Automation _ Netreo", Retrieved at https://www.netreo.com/wpsandbox/solutions/microsoft-azure-automation/, Retrieved at May 2022, 5 Pages.

"Octopus Deploy 2019.11: Operations Runbooks RTW", Retrieved at https://octopus.com/blog/octopus-release-2019.11, Dec. 18, 2019, 4 Pages.

"Octopus Deploy Documentation—Runbooks", Retrieved at https://octopus.com/docs/runbooks, Retrieved on May 2022, 2 Pages.

"Runbook Automation (Rundeck)", Retrieved at https://www.pagerduty.com/resources/learn/aiops-incident-management-2021/, Retrieved on May 2022, 8 Pages.

"Runbooks permissions", Retrieved at https://octopus.com/docs/runbooks/runbook-permissions, Retrieved at May 2022, 2 Pages.

"The Guide to Automating Runbook Execution—Shoreline", Retrieved at https://shoreline.io/blog/the-guide-to-automating-runbook-execution, Feb. 25, 2021, 9 Pages.

"Troubleshoot Azure Automation runbook issues _ Microsoft Docs", Retrieved at https://docs.microsoft.com/en-us/azure/automation/troubleshoot/runbooks, Sep. 24, 2021, 26 Pages.

(56) References Cited

OTHER PUBLICATIONS

"Use runbooks to automate operations activities", Retrieved at https://www.ibm.com/garage/method/practices/manage/runbooks-to-automate-operations/, Retrieved on May 2022, 9 Pages.
"What is Azure Automation Management—Netreo Newtork Moniroting Tool", Retrieved at https://www.netreo.com/cloud-automation/what-is-azure-automation-management/, Sep. 9, 2015, 2 Pages.
"What is Runbook Automation?", Retrieved at https://www.rundeck.com/what-is-runbook-automation, Retrieved on May 2022, 10 Pages.

\* cited by examiner

COLLABORATIVE RUNBOOK EXECUTION

BENEFIT CLAIMS; RELATED APPLICATIONS; INCORPORATION BY REFERENCE

This application claims the benefit of U.S. Provisional Patent Application: 63,236,557, filed Aug. 24, 2021; 63/236,561, filed Aug. 24, 2021; 63/236,563, filed Aug. 24, 2021; 63/236,565, filed Aug. 24, 2021; and 63/261,832, filed Oct. 14, 2021, which are hereby incorporated by reference.

This application further incorporates by reference, in their entirety, U.S. Pat. Nos. 9,164,965, 10,379,990, and 10,678,610.

This application further incorporates by reference, in their entirety, U.S. patent application Ser. Nos. 17/725,116; 17/725,122; 17/725,143 and 17/725,147, all filed on Apr. 20, 2022.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to runbooks. In particular, the present disclosure relates to collaborative runbook execution.

BACKGROUND

Modern information technology systems include a large number of different types of components. For example, there may be database systems, network systems, computer applications, and the like. Each such system may be administered and/or monitored by specialized IT professionals.

During normal operation, a computer system may produce or encounter behavior or results that are not expected or desired by the operators monitoring the system. Such behavior or results may generate event records (for example, process is running slow, or process is stalled). Upon encountering an event log or incident message, a user may wish to diagnose and resolve the issue by executing one or more diagnostic and remediation tasks. A user may execute diagnostic and remediation tasks to address an event as defined by a runbook. The user may create a new runbook to specify a set of operations to diagnose and/or remediate frequently-occurring events. Alternatively, or in addition, the user may execute remediation tasks defined by a runbook to address a user-perceived issue that did not generate an event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
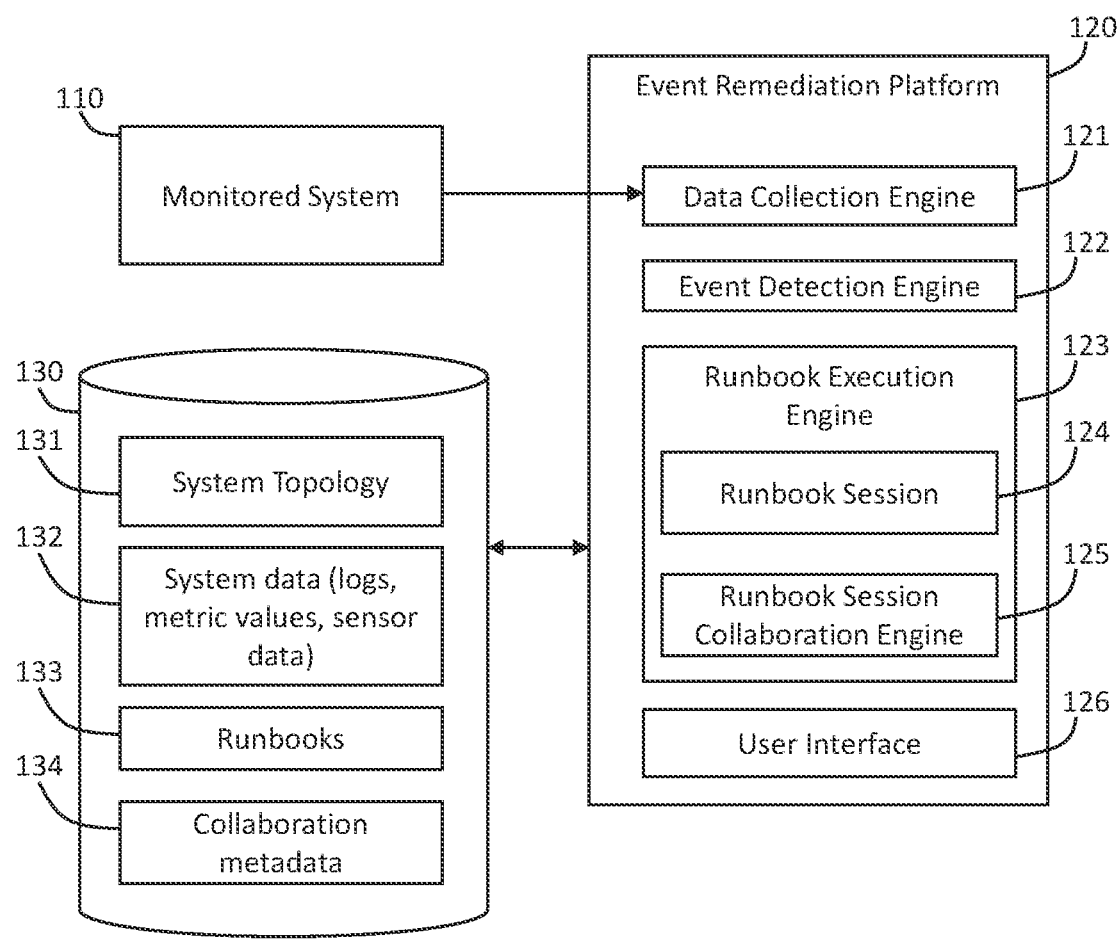
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. COLLABORATIVE RUNBOOK EXECUTION
4. EXAMPLE RUNBOOK OPERATIONS
5. SELECTION OF ENTITY TO PERFORM OPERATIONS BY MACHINE LEARNING
6. EXAMPLE EMBODIMENT
7. COMPUTER NETWORKS AND CLOUD NETWORKS
8. MISCELLANEOUS; EXTENSIONS
9. HARDWARE OVERVIEW

1. General Overview

A runbook defines a set of independently executable operations. In an example, a runbook defines operations for remediating an issue. The set of remediation operations may be used to diagnose a problem, an undesired event, undesired behavior, and/or user-perceived issue. The set of remediation operations may fix the problem, address the undesired event/behavior, and/or obtain more event data for further analysis by a user.

A user may initiate the execution of an operation by a runbook without initiating execution of other operations of the same runbook. Runbook operations may or may not be executed in a same order as included in the runbook. A runbook operation may be executable by a machine(s) without any additional user input subsequent to an initial input that initiates the execution of the operation. Alternatively, a runbook operation may require additional user input subsequent to the initial input that initiates the execution of the operation.

One or more embodiments delegate runbook operations from an owner to another user. A user opens a runbook execution platform to select a runbook. The runbook execution platform opens an interactive runbook session including a set of runbook operations. The user executes operations of the runbook session until the user encounters an operation that the user cannot perform. When the user encounters an operation the user cannot perform, the user delegates performance of the operation to another user. The initial user may retain ownership of the runbook session while the alternate user performs runbook operations. The runbook execution interface determines that a runbook session is completed based on the combined results collaboratively generated by the initial user and the alternate user.

For example, a first user may be unable to perform an operation due to a lack of a necessary authority. A runbook session may include an operation requiring a higher authority level than the first user's authority level. The first user may delegate performance of the operation to a supervisor having the required authority level. The supervisor may open an instance of a runbook execution interface to view, select, and perform the operation. The first user may retain ownership of the runbook session while the supervisor performs the operation. In addition, the supervisor may be a co-owner of the runbook session. Accordingly, both the first user and the supervisor may be able to view results associated with executed operations. In addition, both the first user and the supervisor may be able to perform additional operations for which they have sufficient authority.

As another example, the runbook operation may require access to a database that the first user does not have access to. The database may be managed by a database work group that performs tasks as directed by a service ticket platform. The first user may generate a service ticket in the service ticket platform. The service ticket may specify an operation corresponding to a runbook operation. A member of the work group may open the service ticket in the service ticket platform. The member of the work group may perform the operation and close the service ticket. A runbook operation interface may detect completion of the operation. The runbook operation interface may notify the first user of the completion of the operation by the work group member.

One or more embodiments store metadata associated with runbook operations. The metadata specifies: users authorized to perform particular operations, authority levels required to perform the operations, contact information for contacting the particular users, and entities to be notified by alterations to a runbook session or runbook operation.

One or more embodiments transfer ownership of a runbook from one user to another. user. For example, when the initial user encounters the operation they cannot perform, the initial user transfers ownership of the runbook session to another user. The runbook execution interface determines that a runbook session is completed based on the combined results collaboratively generated by the initial user and the alternate user.

For example, a user in the United States may be at the end of their work shift. The runbook execution interface may identify for the user another work group in India that is beginning its work shift. The user may transfer ownership of the runbook session to the work group in India. The runbook execution interface may generate an interface element in the user interface (UI) of the members of the work group representing the runbook session in progress. Any member of the work group may select the interface element to resume operations of the runbook session. A member of the work group may be designated as the new owner of the runbook session. The member of the work group may be able to observe the results of the operations previously completed by the first user.

According to another example, when the user encounters an operation requiring a higher authority level to execute than the user's authority level, the user may transfer ownership of the runbook session to a user having the required authority level. Upon transferring ownership, the first user may no longer be able to perform operations of the runbook session or observe results of runbook operations.

One or more embodiments designate two or more users as co-owners of a runbook session. The two or more users may simultaneously access the runbook session to perform different operations of the runbook session. Alternatively, the runbook execution interface may permit only one user at a time to execute operations of a runbook session. However, additional co-owners may be able to execute operations of the runbook session if no other user is simultaneously executing operations of the runbook session. In addition, the runbook execution interface may allow multiple owners of a runbook session to observe results of the operations of the runbook session.

One or more embodiments delegate runbook operations to additional users or transfer ownership of a runbook session to additional users via various communications systems. For example, multiple users may open instances of a runbook execution interface on different devices. The runbook execution interface may include functionality to transfer ownership of the runbook session from one user to another. The runbook execution interface may include functionality to delegate execution of one or more runbook operations of a runbook session from one user to another. A user may receive a notification in the runbook execution interface of an operation that has been delegated to the user, for example. According to another example, a first user may send a message including information for performing a runbook operation via email, instant message, text message, and voice message. An email, instant message, or text message may include a link which, when selected, provides the recipient with information about one or more operations of a runbook session for the recipient to execute.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes an event remediation platform 120. In one or more embodiments, the event remediation platform 120 is a hardware and/or software system for generating, presenting, and/or executing runbooks. Components of the event remediation platform 120 may be implemented on a single computing device or distributed across a number of different computing devices. In an example, an event remediation platform 120 may include a data collection engine 121. The data collection engine 121 collects data, such as log data, sensor data, analog and digital device status data, and program state data from a monitored system 110. The data collection engine 121 may also obtain system data 132 from a data repository 130. The system data 132 may include log data, sensor data, and metric values of system performance metrics generated by the monitored system 110.

An event detection engine 122 monitors the data obtained by the data collection engine 121 to detect an event in the system 110. For example, the event detection engine 122 may monitor activity logs generated by one or more applications running in the system 110 and sensor data generating output values based on characteristics of devices in the system 110 to detect a failure of one or more components in the system 110. Examples of events may include: a computing device failing or operating below a defined threshold, an application failing or operating below a defined threshold, access to a device or application by an unauthorized entity, data transmission rates below a defined threshold, data latency along communication channels above a defined threshold, data lost along communication channels above a defined threshold, and sensor levels monitoring system components exceeding, or failing to meet, defined thresholds.

A runbook execution engine 123 generates an interface, such as a graphical user interface (GUI) accessible by a user via the user interface 126 to create, modify, delete, select, and execute runbooks. The runbook execution engine 123 may recommend one or more runbooks for execution based on detecting an event in the monitored system 110. In addition, or in the alternative, the runbook execution engine 123 may recommend one or more runbooks for execution based on detecting user activity—such as interacting with one or more applications or datasets to remediate an event. In addition, or in the alternative, the runbook execution engine 123 may recommend one or more runbooks for execution based on a user running the runbook execution engine 123. In addition, or in the alternative, the runbook execution engine 123 may allow a user to search or browse among previously-generated runbooks.

A user interfaces with the runbook execution engine 123 via the user interface 126 to select a runbook from among the stored runbooks 133. The stored runbooks 133 include sets of operations for diagnosing and/or remediating types of events. The runbook execution engine 123 initiates a runbook session 124 associated with a specific detected event. For example, if a user selects a runbook 133, the runbook execution engine 123 initiates a runbook session to generate a user interface displaying a set of operations. As the user performs the runbook operations in the runbook session 124, the user interacts with graphic interface elements. For example, the user may select an icon representing a runbook operation in the runbook session 124 to display specific instructions for executing the operation. A user may interact with an icon representing completion of an operation to display a next operation in the runbook session 124.

The steps or operations of the runbook session 124 are independently executable. A user may execute one operation without executing the next operation. Some runbook operations may be executed out of any particular order. For example, a runbook may list ten operations. A user may execute the fourth listed operation prior to the first listed operation. Other runbook operations may require execution in a particular sequence. A first-listed operation may be required to be executed prior to execution of the second-listed operation.

A runbook session collaboration engine 125 facilitates collaboration among two or more entities to execute a runbook session 124. For example, a first user may initiate a runbook session 124. The first user may come to a runbook step that the first user is not equipped to perform. The first user may pass ownership of the runbook session to a second user. For example, the runbook execution engine 123 may display an interface element to allow the first user to message the second user to request that the second user complete one or more operations of the runbook session. The second user may access the runbook session on an instance of the runbook execution engine running on a separate computer terminal. The second user may complete a set of operations and return ownership of the runbook session to the first user. Alternatively, the second user may complete the runbook or pass ownership to a third user. According to another example, a first user may delegate one or more operations to another user without passing ownership of the runbook session. The second user may not have access to the runbook execution engine. Instead, the first user may request that the second user perform one or more operations. The second user may notify the first user of the results of the operations. Alternatively, the event remediation platform 120 may detect when the operations have been completed. The event remediation platform 120 may obtain results without the need for the second user to send the results to the first user. Upon obtaining the results, the first user may continue to perform additional operations in the runbook session.

According to one or more embodiments, the runbook session collaboration engine 125 accesses collaboration metadata associated with runbook operations to facilitate collaboration among two or more entities. The collaboration metadata 134 includes entity identification information of a user, a group, or an organization associated with a particular runbook operation. For example, one user may perform nine runbook operations. However, the runbook metadata may identify a second user to perform the tenth operation. The second user may have a particular expertise or authority level required to perform the tenth operation. The collaboration metadata 134 includes authority levels associated with operations. The collaboration metadata 134 associated with a particular runbook session may specify a first, low-level authority level associated with one operation. The collaboration metadata 134 may specify a second, high-level authority level associated with another operation. While a low-level user may initiate the runbook session, the low-level user would be required to pass ownership of the runbook session to a higher-level user to perform the second operation.

The collaboration metadata 134 may identify one or more entities to be notified based on a status change of a runbook session. For example, a particular runbook may specify general entities [tenants] and a specific employee, Supervisor A. Upon initiating the runbook session, the runbook execution engine 123 may populate identification information associated with the [tenants] based on the particular tenants associated with the runbook session. The runbook execution engine 123 may further obtain the notification information associated with the tenants. For example, the collaboration metadata 134 may include email addresses, phone numbers, instant message account names, or other addresses to which the platform 120 may send notifications. When a status of the runbook session changes, such as when a user completes operations in the runbook session, the runbook execution engine 123 may send a notification to the affected tenants and to Supervisor A.

The collaboration metadata 134 includes ownership information associated with runbook sessions. An owner of a runbook session is an entity (a) responsible for completing runbook operations who can, and (b) see results obtained from performing runbook operations, and (c) can close the runbook session upon completion of the runbook session. The functions (a), (b), and (c) may be separately delegated to different entities or collectively shared by multiple different entities. For example, a user may be able to perform (a) and (b). However, a supervisor may be required to perform (c).

A data repository 130 includes one or more data storage components that store information in memory. The data repository may store, for example, a system topology 131 associated with a monitored system 110, system data 132 that may be accessed by the event remediation platform 120 to recommend runbooks for execution, and runbooks 133. In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the event remediation platform 120. Alternatively, or additionally, a data repository 130 may be implemented or executed on a computing system separate from the event remediation platform 120. A data repository 130 may be communicatively coupled to the event remediation platform via a direct connection or via a network.

Information describing the system topology 131, system data 132, and runbooks 133 may be implemented across any of components within the system 100. However, this information is illustrated within the data repository 130 for purposes of clarity and explanation.

The event remediation platform 120 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, interface 126 refers to hardware and/or software configured to facilitate communications between a user and the event remediation platform 120. Interface 126 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 126 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 126 is specified in one or more other languages, such as Java, C, or C++.

3. Collaborative Runbook Execution

Figure 2:
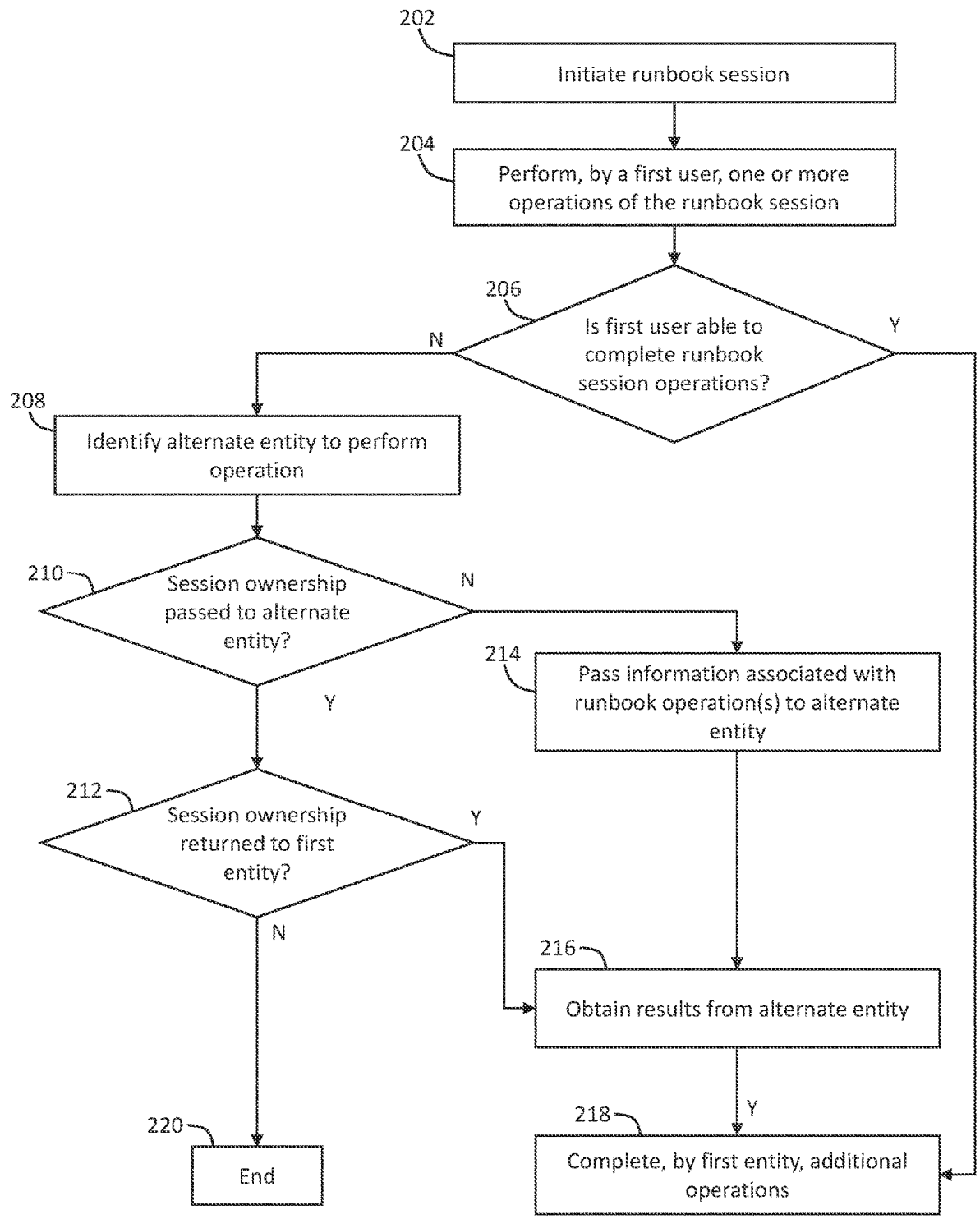
FIG. 2 illustrates an example set of operations for collaborative runbook operations, in accordance with one or more embodiments.
Figure 3:
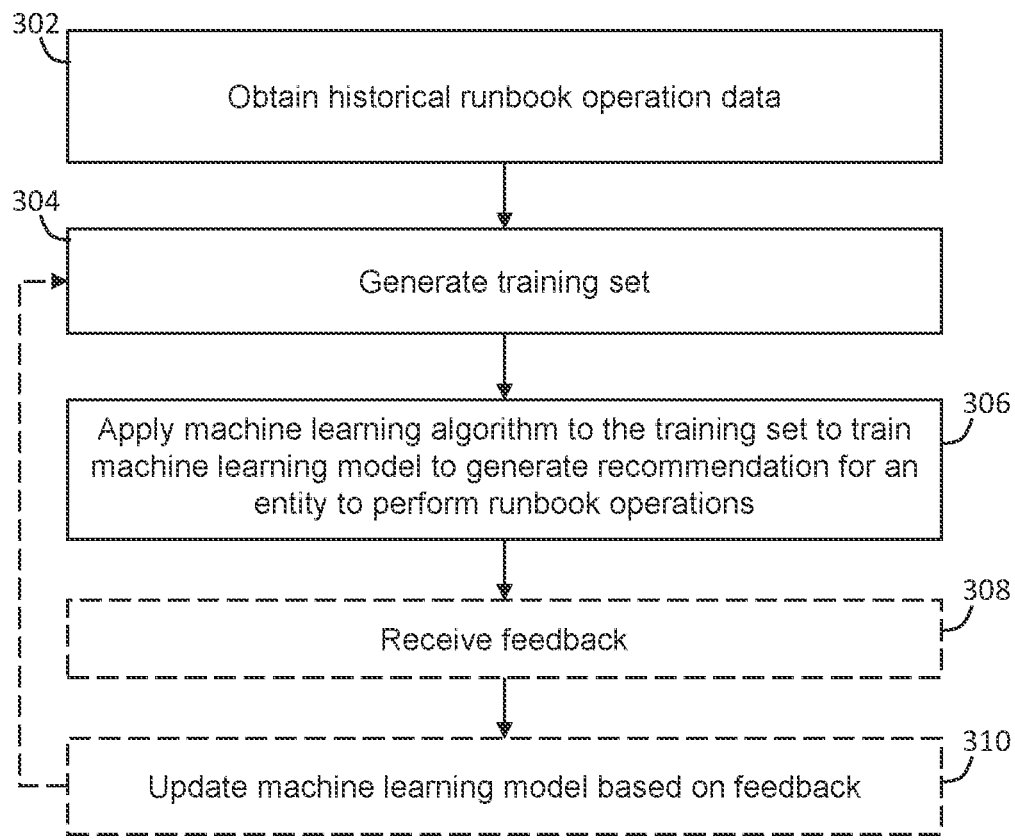
FIG. 3 illustrates a set of operations for training a machine learning model, in accordance with one or more embodiments.

FIG. 2 illustrates an example set of operations for collaborative runbook execution in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system initiates a runbook session (Operation 202). The system may provide a user interface element on a graphical user interface of a runbook execution platform to allow a user to select a runbook. Selecting the runbook may result in displaying one or more user interface elements associated with independently executable operations corresponding to steps of the runbook. According to one or more embodiments, the system may identify one or more candidate runbooks to display to a user. The system may identify the candidate runbooks based on recently-detected system events, for example. According to another example, the system may identify the candidate runbooks based on text entered by a user in a search field.

As described above, the runbook may define a list of operations that are independently executable. In other words, a user may execute certain operations of the runbook but may not execute certain other operations of the same runbook. According to one embodiment, operations of a runbook generated using a runbook execution interface may be executed in any sequence. In addition, or in the alternative, some operations may be required to be executed in a particular sequence.

According to one or more embodiments, a runbook execution interface may enable a user to see a list of runbook operations and also one or more of the runbook operations in detail, individually or as part of an execution of some or all of the runbook operations. A runbook execution interface may provide a UI item (e.g., a button labeled "Execute Runbook") that, if selected, executes some or all of the runbook operations in response.

The system may identify attributes associated with a detected event, or an event entered by a user in a field of a user interface. The system may identify a topology associated with the detected event. The system may identify multiple topologies meeting the similarity criteria to the topology associated with the detected event. The system may present the runbook associated with the candidate topology that has the highest similarity to the system topology. The system may rank a plurality of runbooks associated with a plurality of candidate topologies based on the degree to which the candidate topologies are similar to the system topology. The system may present, via a GUI, a predefined number of the candidate runbooks to diagnose or remediate an event. The system may rank the candidate runbooks based on the degree to which the candidate topologies are similar to the system topology. For example, the system may display a candidate runbook associated with a topology having a highest similarity ranking above a candidate runbook associated with a topology having a next-highest similarity ranking.

According to one or more embodiments, presenting the runbook to diagnose a cause of an event and/or remediate the event may include displaying information about why the candidate runbook meets the similarity criteria. For example, the system may information about the candidate topology, such as, "Candidate topology includes nodes A, B, and C connected to device X." The system may display, via text or via visual elements (without text) representing components of the system topology and/or components of the candidate topology.

According to one or more embodiments, the system may include additional criteria, in addition to determining whether a similarity criterion is met between a candidate topology and the system topology, to determine whether to present a particular runbook to diagnose a cause of an event and/or remediate an event. For example, the system may determine whether similarity criteria are met between the detected event, and an event associated with a particular runbook. In other words, the system may select a runbook to present to remediate an event based on both (a) a similarity of the detected event with an event associated with the runbook, and (b) a similarity of a topology associated with the detected event and a topology associated with the runbook. According to one or more embodiments, the system identifies topological and event-based relationships by collecting metadata associated with a detected event. Metadata includes, for example, a user ID, time, device ID, application ID, application type, port numbers associated with an event, power sources associated with a device, communication channel types, communication protocols, encryption types, data types, and data content (e.g., whether data associated with an event is associated with an operating system (OS) or an application running on the OS, whether data associated with an event is associated with a particular tenant of cloud-based environment, etc.).

A first user performs one or more operations in the runbook session (Operation 204). The runbook operations may include runbook operations entirely by a user, without computer contribution. For example, an operation may direct a user to check a physical state of a system component. The runbook operations may include operations carried out by the user based on user interaction with the UI. For example, a runbook operation may direct a user to check values in a register. The user may interact with the UI to call and display values stored in a register. According to another example, the runbook operation may be an operation that is carried out by a computer based on the user interaction with the UI. For example, a runbook operation may direct a user to initiate a virus scan. The user may select an interface element in the UI to initiate the virus scan. As a result of the user interaction with the UI, the computer may perform the virus scan. One or more of the operations may be performed by a computer without human input. For example, a computer may initiate; runbook operations initiated by a computer without user initiation, based on detecting completion of a prerequisite operation (such as a computer detecting completion of a preceding step in the runbook); and runbook operations requiring performance of multiple different users.

For example, a user may interact with a user interface element on a visual depiction of the runbook in a runbook execution interface. In one or more embodiments, a computer executes the runbook operation based on a user input. For example, a runbook operation may be displayed together with a selectable user interface element. Selection of the user interface element may result in the computer performing the corresponding operation. For example, a runbook operation named "run antivirus software" may include a selectable button that, when selected, causes the computer to run the antivirus software. According to an alternative embodiment, a user may execute the runbook operation independently of a computer. For example, a runbook operation named "check data port connector" may direct a user to check the physical connection of a data cord with a data port. The depiction of the runbook operation may include a selectable element indicating the operation has been completed by the user. The system may then highlight the next operation in the runbook session. According to yet another embodiment, the system may execute a runbook operation with a combination of user action and computer action. For example, a runbook operation named "compare data transfer rates to thresholds" may be displayed with a selectable button to "obtain data transfer rates." The system may obtain the measured data transfer rates from system logs based on a user selection. The user may then compare the computer-retrieved values to threshold values to execute the runbook operation.

The system determines whether the first user is able to complete one or more of the runbook operations of the runbook session (Operation 206). The system may determine that another user is required to complete one or more operations based on, for example, a required authority level to perform the operations, a different organization or work group in an organization required to perform a task, a different technical expertise required to perform a task. In addition, or in the alternative, the system may determine that another user, other than the first user, is required to perform a task based on a user instruction.

According to one example, the system may determine that a particular operation requires performing a particular sequence of queries to a database. The first user may not have authorization to access the particular database. As another example, the system may determine that a particular operation is associated with a different organization within an enterprise. The first user may not have access to a platform or component required to complete the operation. According to another example, the system may receive an input from the first user indicating that the first user cannot complete the runbook operations. For example, the first user may be an IT specialist. The first user may indicate that a next operation must be performed by another IT specialist on a next shift.

The system identifies an alternative entity to perform one or more operations of the runbook session (Operation 208). For example, a runbook execution interface may store metadata associated with runbook operations indicating users and/or user attributes required to perform an operation. The system may store a user ID associated with a particular user required to perform an operation. Alternatively, the system may store an authority level or technical expertise required to perform a particular operation. The system may store contact information associated with a user or entity required to perform an operation. The system may identify the alternate entity based on a user input. For example, a user may encounter an operation that the user cannot complete. The user may provide information to the system of an alternative entity to complete the operation.

The system determines whether the first user must pass ownership to the alternative entity (Operation 210). Some operations may require the first user to retain ownership of the runbook session while the alternative entity completes one or more operations of the runbook session. Other operations may optionally allow the first user to retain ownership, or pass ownership to an alternative entity, while the alternative entity is performing one or more operations. Yet other operations may require the first user to pass ownership to the alternative entity when the alternative entity performs one or more operations.

As an example of an operation that requires the first user to pass ownership to an alternative entity, the runbook session may specify a set of operations to restore state data of a computing device to a previous state. The set of operations in the runbook session may include a first set of operations performed by a technician to prepare the computing device to receive the stored state data. The set of operations may include a second set of operations requiring performance by a supervisor-level employee. The runbook session may specify that the second set of operations require transferring ownership of the runbook session to the supervisor-level employee.

As another example of an operation that requires the first user to pass ownership to an alternative entity, the first user may be at the end of a work shift. The first user may need to transfer ownership of the runbook session to another IT team beginning their work shift to complete the operations of the runbook session.

As an example of an operation that requires the first user to retain ownership of a runbook session while an alternative entity performs one or more operations, the runbook session may a user having a particular authority level to observe results of the runbook session. The runbook session may include an operation requiring a remotely-located technician to obtain a measurement. The first user may send a message to the remote technician requesting performance of the operation to obtain the measurement. The remote technician may or may not have access to the runbook execution engine. As the remote technician performs the operations, the first user retains ownership of the runbook session.

If the system determines that the runbook execution interface does not pass ownership of the runbook session to the alternate entity, the system passes information to the alternate entity associated with the runbook operations to be performed by the alternate entity (Operation 214). According to one example, both the first user and the alternate user access operation information for runbook session operations by interacting with a runbook execution interface. The first user may complete a first set of operations. The first user may send a message to the alternate entity via the runbook selection interface requesting the alternate entity complete one or more runbook operations. The system may generate in the runbook execution interface of the alternate entity a message or selectable icon. Upon selection of the message or selectable icon, the system may provide information to the alternate entity that the alternate entity needs to complete one or more tasks. For example, a runbook execution interface may direct a technician to perform one or more operations to "verify contents of database location X."

According to another embodiment, the first user may request an alternate entity to perform one or more runbook operations independently of the runbook execution interface. For example, the first user may request a work group to check component values at a remote site. The work group may not have access to the runbook execution interface. The first user may send the request via a text message, via a cloud-based message service, such as SLACK, via email, via an automated voice message service, via instant message, via a telephone call, or directly, in person. For example, the first user may send an email: "We are executing a runbook to update application X on the server. Could you send client notifications of a temporary outage tonight? Let me know when you've done so. [signed]"

According to one or more embodiments, the system may selectively provide results from runbook operations to the alternate entity. For example, if the first user requests the alternate entity to perform the operations via text, the alternate entity may not obtain any of the result from the previously-performed runbook operations. Likewise, if information in the previously-performed runbook operations requires a particular authorization level that is higher than an authorization level of the alternate entity, the system may not send the results to the alternate entity. Conversely, the alternate entity may require results from previous operations to perform their particular operations. For example, the alternate entity may open a set of operations directing the entity to provision a new node in a cloud environment based on previously-obtained results. For example, a previous operation performed by the first user may have directed the first user to obtain node usage data. The alternate entity may provision the new node based on the previously-obtained node-usage data. According to one or more embodiments, the system may provide, selectively, no results to an alternate entity, a subset of previously-generated results to the alternate entity, or all the previously-generated and currently-generated results to the alternate entity.

If the system determines that the first user must pass ownership to the alternative entity, the system determines whether the alternative entity returns ownership of the runbook session to the first user (Operation 212). According to one example, the alternative entity may complete the operations of the runbook session without returning ownership of the runbook to the first entity, at which point the process ends (Operation 220). According to another example, after completing one or more operations, the alternative entity returns ownership of the runbook to the first user.

The system obtains results from the alternate entity (Operation 216). If the alternate entity passes ownership of the runbook session back to the first user, the first user may access the results associated with the runbook session. If the first user retained ownership of the runbook session, the first user may obtain results directly from the alternate entity. The first user may then enter the results into the system. Alternatively, the system may obtain the results via the runbook execution interface or via another system.

According to one example embodiment, the system monitors one or more applications to detect completion of the operations. For example, the first user may request performance of one or more operations by generating a "ticket" in a ticket-based event-remediation application. For example, cloud service provider may include an IT team that receives and generates tickets when events arise requiring diagnosis and remediation. Any member of the team may open a ticket, address the event identified in the ticket, and close the ticket. The tickets may be generated by members of the IT team, based on client communications (such as complaints or requests to modify system components), or by a system-monitoring application detecting anomalies in the system. The ticket-based event-remediation application may be independent of the runbook execution interface. The first user may identify an operation that requires performance by the IT team. The first user may initiate a ticket. The IT team may open the ticket and perform actions necessitated by the ticket. The system may detect performance of the action. For example, if the ticket states "need to reset passwords for users A-E," the system may monitor an application associated with the passwords to detect when the IT team has reset the passwords. Alternatively, the system may monitor the ticket-based event-remediation application to detect when a member of the IT team closes the ticket.

As noted above, according to one or more embodiments, the runbook execution interface includes functionality to communicate with one or more additional applications to: (a) send communications to request or require performance of one or more tasks associated with runbook operations, (b) detect the state of hardware components, software components, and data to detect when operations are completed, and (c) receive communications from the additional applications to obtain results associated with completing tasks associated with runbook operations. According to an example embodiment, the runbook execution interface includes functionality to perform application programming interface (API) calls to one or more additional applications to perform the communications and monitor the applications for performance of the runbook operations. For example, the runbook execution interface may detect a first user initiating a ticket in a ticket-based event-remediation application. The runbook execution interface may, without express user instructions, execute an API call to the ticket-based event-remediation application to monitor the status of the ticket initiated by the first user. Based on detecting a change of status of the ticket from "open" to "closed," the runbook execution interface may generate a notification to the first user that the results associated with the ticket are available. In addition, or in the alternative, the runbook execution interface may generate a notification that a next operation is available to be performed by the first user.

According to another example embodiment, the system receives a user input from the first user with the results. For example, if the first user sends an instant message to an associate requesting performance of a task, the associate may reply via instant message with the results. The first user may then manually enter the results in the runbook execution interface.

The runbook operation results may be obtained based on computer actions, user actions, and combinations of computer actions and user actions. As discussed above, a computer-implemented runbook operation may include running antivirus software. The computer may run the antivirus software and display results, such as "malware detected," "virus detected," and "10 items require attention." The operation results may include a user input when the runbook operation is user-implemented independent of a computer. According to another example, a monitoring device may measure a temperature in a server room. According to additional examples, a computer may measure data transmission rates (e.g., running a network speed test) and voltages and currents within electronic circuits. According to another example, a system may download data describing data storage or data transmission of a device over time. In the example in which the user checks the physical connection between a data cable and a data port, a user may select an icon indicating "connection secure." Additional examples include observing a physical condition of a wire (e.g., where frayed or intact), connection (e.g., wiring is physically severed), a circuit board, rack, or any physical characteristic of a network component.

Based on obtaining the results from the alternate entity, the first user completes additional operations to complete execution of the runbook (Operation 218). The first user may use information in the obtained results from the alternate entity to complete one or more runbook operations. For example, the alternate entity may provide to the runbook execution interface a set of data associated with a system component. The first user may complete additional runbook operations based on the set of data.

4. Example Runbook Operations

According to one or more embodiments, two or more entities collaboratively complete a runbook session based on performance of different runbook operations by different entities. As discussed above, an entity may be an individual, a work group, or an organization. For example, a user may interact with a UI interface element corresponding to an event "lost communication to server." Operations directed to diagnosing the cause of the event may include checking power connections, checking physical data port connections, checking a communication status of an adjacent device in the system topology, and checking port configuration settings in software. Operations directed to remediating the event may include setting port configuration settings to predefined values, replacing an adjacent device that is not communicating with the server, and initiating a reboot of the server.

According to one or more embodiments, runbook sessions include runbook operations directed to routine operations, emergency operations, and infrastructure provisioning operations. Examples of routine operations include regularly-scheduled physical component maintenance, memory garbage-collection, software updates, virus scans, and system performance analysis. Examples of emergency operations include operations to diagnose a server failure, operations to restart a server, operations to identify a cause of corrupt data, operations to diagnose a cause of client complaints associated with system components or applications, operations to diagnose an application crash, and operations to restore application data subsequent to an application crash. Examples of infrastructure provisioning operations include operations to configure and provision cloud environments, virtual computing machines, and applications running on computing devices.

According to one or more embodiments, runbook sessions include: runbook operations performed entirely by a user, without computer contribution; runbook operations described by a computer on a UI and carried out by the user based on user interaction with the UI; runbook operations initiated by a user based on a user interaction with a UI, and carried out by a computer based on the user interaction with the UI; runbook operations initiated by a computer without user initiation, based on detecting completion of a prerequisite operation (such as a computer detecting completion of a preceding step in the runbook); and runbook operations requiring performance of multiple different users.

For example, runbook operations performed entirely by a user, without computer contribution may include a user checking physical characteristics of devices. A user may check the connection states of physical wires or cables. A user may observe whether a device is damaged or misshaped. A user may observe whether a physical component is discolored. A user may observe the physical status of a fuse or circuit breaker. A user may observe whether a device is physically located at the correct location relative to other physical devices. A user may use a sensor device to measure characteristics of an environment or a physical object. For example, a user may measure a voltage, current, or resistance at a point in an electrical circuit. A user may measure a temperature or humidity in a room housing computing devices.

According to another example, runbook operations described by a computer on a UI and carried out by the user based on user interaction with the UI may include a user initiating a computer-based measurement or calculation by pressing a button on a UI. For example, a runbook operation may direct a user to check the values stored in a register in memory. The user may press a button "check register values" to cause the computer to retrieve and display the register values. A runbook for creating a new instance of a cloud computing environment may include an operation to "select environment template." A user may interact with a UI interface element to cause the computer to retrieve previously-stored cloud environment templates. The user may select from among the cloud environment templates to generate a new instance of a cloud environment. A runbook operation may direct a user to "update security certificates." The user may interact with the user interface element "update security certificates" to cause the computing device to communicate with servers over a network to generate a list of security certificates associated with one or more applications running on a computer that may be updated. The user may interact with the UI to select the particular security certificates to be updated.

According to another example, runbook sessions include runbook operations initiated by a user and carried out by a computer, based on a user interaction with a UI. For example, a runbook operation may include functions that are incapable of being performed by a human and may only be performed by a computer. Examples of operations that are only capable of being performed by a computer include: accessing and manipulating data in electronic memory, performing virus and malware scans, communicating electronically over a network, and performing complex calculations on electronic data. A runbook operation may direct a user to stop applications running on a server to allow a subsequent operation of applying a software patch to the server. A user may interact with a UI interface element "stop applications" to cause the computer to stop the applications running on the server. A runbook operation may direct a user to "apply software patch" to an application or operating system. The user may interact with a user interface element "apply software patch" to cause the computer to apply the software patch to the application or operating system. A runbook operation may direct a user to "initiate garbage collection." The user may interact with a user interface element of a UI to cause the computer to perform a garbage collection operation in a specified region of memory. A runbook operation may direct a user to "deploy cloud environment instance." The user may interact with a user interface element on a UI do direct the computer to deploy the cloud environment instance. The computer may then configure applications, tables, databases, and other system components to instantiate a new cloud environment.

According to another example, runbook sessions include runbook operations initiated by a computer without user initiation. For example, an event remediation platform executing on a computer may monitor a state of a system component. A user may execute a runbook operation to change the state of the system component. The computer may, without receiving user input to initiate a runbook operation, execute a subsequent runbook operation based on detecting the change of state of the system component. For example, a runbook may include two operations: reset server and restore default settings. A user may physically reset the server to perform the first operation. The event remediation platform may detect the server reset and, without user action to initiate the second operation, restore a set of default settings in an application or operating system of the server. According to another example, a computer may perform a runbook operation without detecting any user action. For example, a runbook operation to "renew security certificates for application" may not require any user operations to execute. Accordingly, the computer may initiate the application immediately upon detecting user selection of the runbook for execution. The computer may perform the operation out of sequence. For example, the runbook may include three operations that require user action. The operation to "renew security certificates for application" may be the fourth operation listed in the runbook. The computer may perform the operation to renew the security certificates for the application prior to the user performing the preceding three operations.

According to another example, runbook sessions include runbook operations requiring performance of multiple different users. For example, a runbook may include a first set of operations that are associated with a first authorization level. A first technician may perform the first set of operations. The runbook may include another set of operations requiring a higher authorization level. The technician may transfer the runbook to a supervisor to perform the second set of operations. As another example, access to a particular system component may be restricted to a particular work group. A user may execute a series of operations that are not associated with the particular system component. The user may transfer the runbook to the work group to complete the runbook operations associated with the particular system component. The system may recommend for inclusion in a runbook operations that require transferring ownership of the runbook among different users. Alternatively, runbook sessions include runbook operations that require different users to perform operations without transferring ownership from one user to another. For example, the system may include a runbook operation to "obtain database status report from database management team." The user executing the runbook may be required to send a request to another entity to obtain the report. The other entity performs operations, without necessarily having knowledge of the runbook operation, to generate the report. The user executing the report may initiate another runbook operation based on receiving the report results.

One or more embodiments delegate execution of different operations of a runbook to different users. The runbook management system aggregates the results of different runbook operations, authorized and/or executed by different users, for presentation in a runbook execution interface.

5. Selection of Entity to Perform Operations by Machine Learning

According to one or more embodiments, a system may apply a machine learning model to a set of data associated with one or more runbook operations to recommend an entity to perform a runbook operation. For example, a user may initiate a runbook session and perform a sequence of runbook operations. The system may provide to a trained machine learning model runbook data including topology data and event data associated with one or more yet-to-be-executed runbook operations in the session. The trained machine learning model generates a recommendation to display to the user of an entity to perform the one or more yet-to-be executed runbook operations.

For example, the machine learning model may learn that a particular operation associated with a particular topology and event is associated with a particular entity having a particular technological expertise, particular access to a system component, or a particular authority level. The system may generate a notification to the user identifying the entity to which the user may transfer the runbook session or delegate performance of a runbook operation. According to one embodiment, recommending an entity to perform an operation includes providing the user presently executing operations in the runbook session with contact information, such as an email address or phone number. According to another embodiment, recommending an entity to perform an operation includes providing the user presently executing operations in the runbook session with a link in a runbook execution interface to transfer ownership of the runbook session to another user of the runbook execution interface. Alternatively, the link may be to send a message within the runbook execution interface to the recommended entity regarding taking ownership of the runbook session or performing one or more delegated runbook operations.

According to an embodiment, the system trains the machine learning model based on historical runbook operation data. For example, the system may obtain historical data specifying, for particular runbook operations: (a) whether a user has transferred ownership of a runbook session to another entity upon encountering a particular runbook operation, (b) whether a user has delegated performance of an operation to another entity upon encountering a particular runbook operation, (c) a technological expertise of (i) the user and (ii) an entity an entity to which a runbook session was transferred or two which a runbook operation was delegated, (d) an authority level of (i) the user and (ii) an entity to which a runbook session was transferred or two which a runbook operation was delegated, (e) topology data associated with the runbook operation, and (f) event data associated with the runbook operation (Operation 302).

Once the various data are identified, the system generates a set of training data (Operation 304). Training data may include sets of runbook operations, the characteristics associated with the operations, and the entities that performed the operations, including whether one entity transferred a session or operation to another prior to performance of the operation.

The system applies a machine learning algorithm to the training data set (Operation 306). The machine learning algorithm analyzes the training data set to identify data and patterns that indicate relationships between runbook operations and entities that performed the runbook operations. Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In examples of supervising ML algorithms, the system may obtain feedback on the whether a particular entity should be associated with a particular runbook operation (Operation 308). The feedback may affirm that a particular entity should be associated with the particular runbook operation. In other examples, the feedback may indicate that a particular entity should not be associated with the corresponding runbook operation(s). Based on the feedback, the machine learning training set may be updated, thereby improving its analytical accuracy (Operation 310). Once updated, the system may further train the machine learning model by optionally applying the model to additional training data sets.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
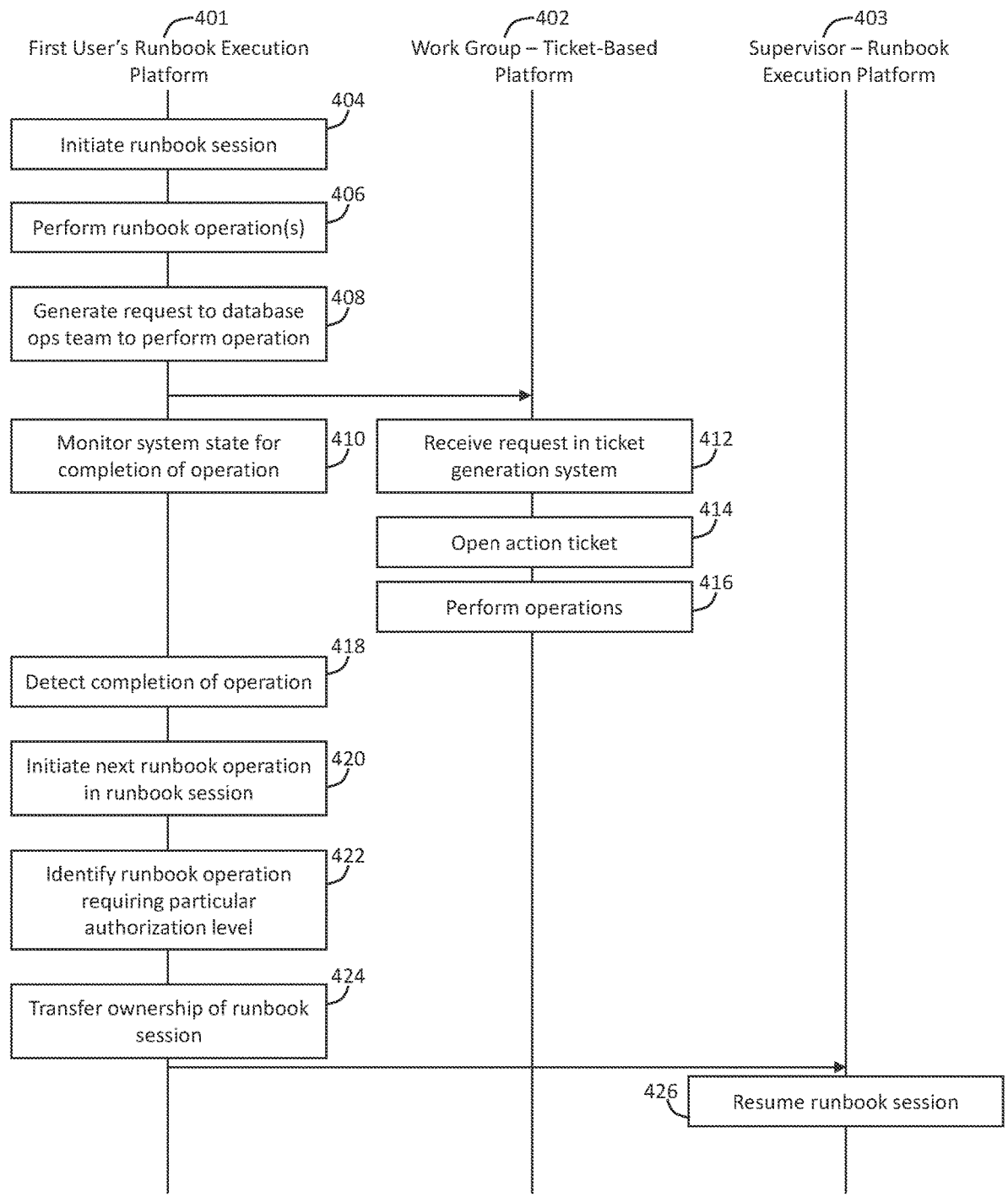
FIGS. 4A and 4B illustrate an example embodiment of collaborative runbook operations.
Figure 4B:
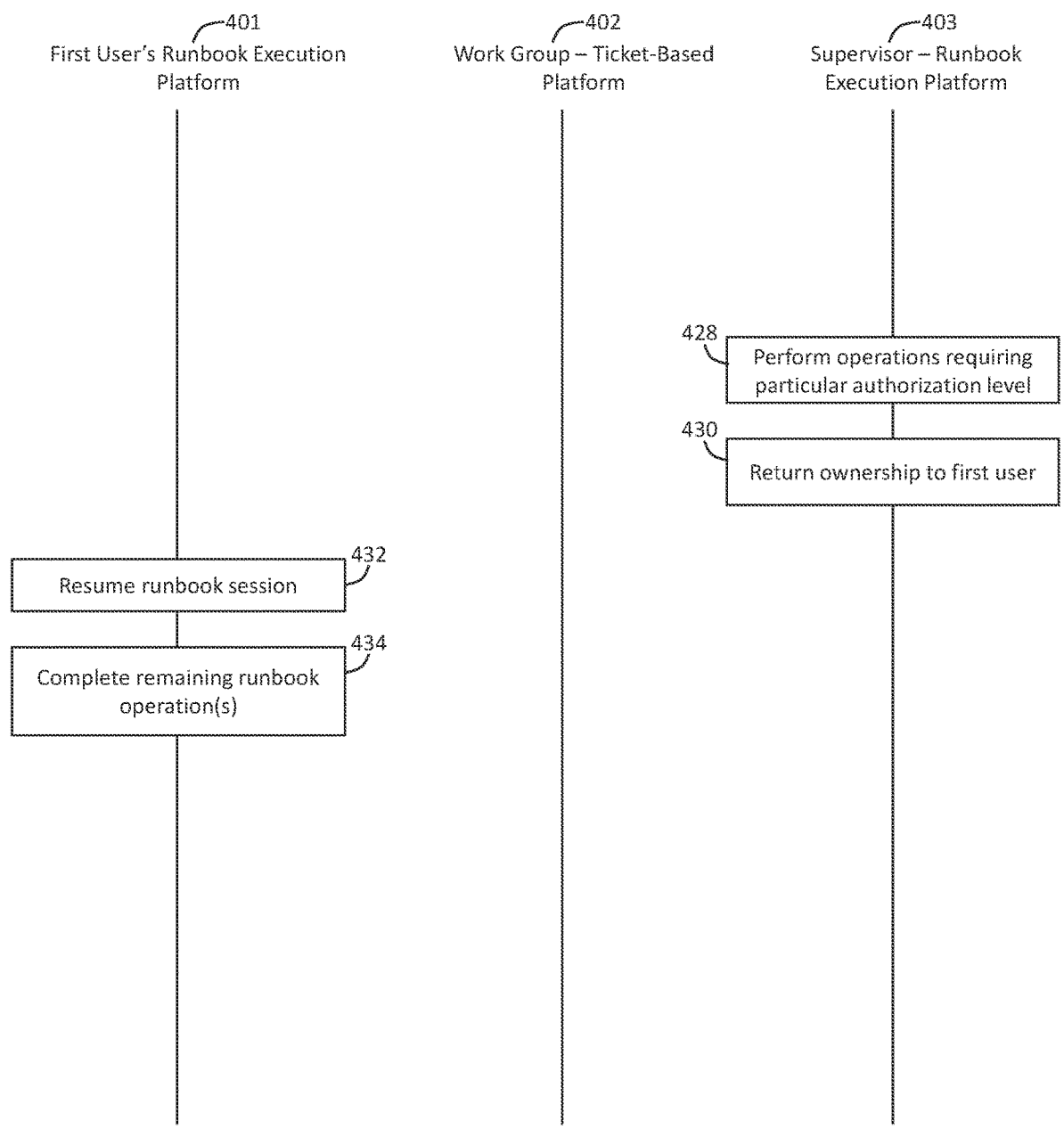

FIGS. 4A and 4B illustrate collaborative runbook execution among a first user 401 using a runbook execution platform, a work group 402 using a ticket-based event remediation application, and a supervisor user 403 using the runbook execution platform.

The first user initiates a runbook session by selecting a stored runbook. (Operation 404) The first user interacts with the runbook execution platform to select a runbook. For example, the first user may receive an alert in a cloud computing environment that an application run by a particular tenant on a cloud resource is experiencing an anomalous data transmission rate. The first user may enter a search term "high data transmission cloud server." The system may identify the event associated with the search term. For example, the system may determine, based on the search, that the first user received the alert regarding the anomalous data transmission rate. The system may analyze a topology of the cloud system to identify one or more runbooks to recommend to the user based on the event data and topology data. In response to the runbook recommendations provided by the runbook execution platform, the first user initiates a runbook entitled "Excessive data transmission rate to/from cloud servers."

The runbook execution platform displays a series of independently-executable runbook operations. The system may recognize that at least one of the runbook operations may not be performed by the first user. For example, the last three operations in the runbook session require an authority level higher than that of the first user. The system may generate a visual indication that the first user may not complete the runbook. For example, the runbook execution platform may distinguish the last three operations in the runbook session with a "warning" icon ("!") or an outline of a different color than the remaining runbook operations.

The first user executes one or more operations in the runbook session. (Operation 406) Upon completion of a particular operation, the user may select an interface element, such as a check-mark, representing completion of the operation. In some cases, the system may automatically detect completion of an operation. For example, one operation is to "retrieve data transmission log from server." The system detects once a download of a data transmission log is complete. The system may, without express user instructions, generate a visual indicator that the particular operation is complete. The system may highlight a next operation in the runbook session for completion by the user.

The first user may identify an operation in the runbook session that the first user cannot complete. For example, the runbook session may include an operation to "obtain request rate data from additional tenants of server" and "reset gateway." The first user may not have access to the systems that would provide the request rate data from additional tenants of the cloud system. The first user generates a request to a database operations team responsible for managing components associated with database requests (Operation 408). The database operations team performs tasks associated with databases by closing out tickets in a ticket-based event-remediation platform. Accordingly, the first user generates a ticket requesting the database operations team to obtain the request rate data from the additional tenants of the server. In addition, the first user requests the database operations team to reset a gateway managing requests to the server and the database. The runbook execution platform may detect that the first user will need to request the database operations team to perform an operation. The runbook execution platform includes an interface element that is selectable by the first user to "generate ticket." Upon selection of the interface element by the first user, the runbook execution platform communicates with the ticket-based event remediation platform to generate a new ticket in the platform. The runbook execution platform may automatically populate the ticket based on the runbook operation. The runbook execution platform may further provide a field for the first user to generate additional comments for the database operations team.

The database operations team receives the request from the first user via the ticket-based platform (Operation 412). Specifically, the ticket-based platform generates a UI for each team member including outstanding tickets. The tickets may be assigned to particular team members. Alternatively, the tickets may be available for selection may any team member. In other words, two team members accessing the UI may select from among the same set of displayed tickets.

A member of the database operations work group opens the ticket (Operation 414). The member of the database operations work group may select the ticket from among a set of displayed tickets on a UI of the ticket-based platform. The runbook execution platform may monitor a status of the ticket in the ticket-based platform. The runbook execution platform may provide the first user with update information about the ticket, such as a database operations team member that opened the ticket, a time that the ticket was opened, a duration of time that the ticket has been open, and if the ticket was transferred to another database operations team member.

The development operations team member performs one or more operations associated with the ticket and the runbook operations (Operation 416). For example, one database operations team member may perform a runbook operation, specified in a ticket, to obtain request rate data for tenants of a specified server. The team member may transfer the ticket to another team member to reset a gateway device in the cloud environment.

The runbook execution platform detects that the operations have been completed (Operation 418). For example, the ticket-based platform may generate an email to the first user including the request rate data for tenants of a specified server. In addition, the runbook execution platform may detect a state of the gateway device. Based on detecting a change in the state of the gateway device (e.g., based on monitoring the state for completion of the operation (Operation 410)), the runbook execution platform may detect that the gateway device has been reset. Accordingly, the database operations team performs operations of the runbook session without necessarily being aware of the runbook session. Instead, the database operations team is aware of service tickets displayed in a ticket-based platform. The database operations team performs the runbook operations by performing the operations specified in the service tickets of the ticket-based platform.

Based on detecting completion of the runbook operations by the database operations team, the first user initiates the next runbook operation in the runbook session (Operation 420). For example, one runbook operation may direct the first user to determine whether the request rates of the additional tenants were anomalous. Another runbook operation may direct the first user to observe request rates from the particular tenant after resetting the gateway device.

As discussed previously, the system may identify one or more runbook operations that require action by a user having a higher authority level than the first user (Operation 422). For example, based on determining that the requests to access cloud resources by the particular tenant were valid requests, the next operation may be to provision an additional node in the cloud environment for use by the particular tenant. The cloud service provider policy may require any changes in the topology of the cloud environment be enacted by a supervisor-level employee.

Accordingly, the first user may transfer ownership of the runbook session to a supervisor (Operation 424). The supervisor may have access to the same runbook execution platform as the first user. Accordingly, the runbook execution platform generates a notification to the supervisor that a task is waiting to be performed.

The supervisor accesses the runbook execution platform to resume the runbook session initiated by the first user (operation 426). The runbook execution platform may include a UI display that includes "pending runbook sessions." The runbook execution platform may populate the "pending runbook sessions" with the runbook session received from the first user. The supervisor may select an interface element associated with the runbook session to display a list of operations. The runbook execution platform may visually distinguish the operations previously performed by the first user from the remaining runbook operations. For example, completed operations may be minimized and/or grayed-out. A next operation may be highlighted. Future operations may be minimized, but not grayed-out.

The supervisor performs the operations requiring the supervisor's authority level (Operation 428). For example, the supervisor may provision the cloud environment with an additional node assigned to the particular tenant. The supervisor may update a service agreement with the particular tenant to include operation of the newly-provisioned node. The runbook execution platform displays for the supervisor results associated with the previously-performed operations performed by the first user. For example, the supervisor may analyze the previously-obtained request rate data to determine whether to approve and provision a new node for the particular tenant.

Upon completion of the operations requiring the supervisor's authority level, the supervisor returns ownership of the runbook session to the first user to complete the runbook (Operation 430). The runbook execution platform may include an interface element to transfer ownership of a runbook session to another user or entity, such as a work group. The runbook execution platform may detect operations that do not require the supervisor's authority level. For example, while some operations require an elevated authority level to complete, other operations may optionally be performed by either the supervisor or the first user. The runbook execution platform may display an interface element associated with operations that do not require the supervisor's authority level. The supervisor may choose whether to complete the operations themselves, or whether to transfer ownership of the runbook session to another user, such as a user having a lower authority level. The runbook execution engine may generate, without an express user instruction, an interface element to allow the supervisor to return the runbook session to a previous owner. For example, after completing the operations that required the supervisor's authority level, the runbook execution platform may display an interface element to "Return Runbook Session to [First User]." Upon selection of the interface element, the runbook session is removed from a list of runbook sessions associated with the supervisor and added to a list of runbook sessions associated with the first user.

The first user accesses the runbook execution platform to resume the runbook session (operation 432). The runbook execution platform may display the runbook session in the UI display: "pending runbook sessions." The runbook execution platform populates the "pending runbook sessions" with the runbook session received from the supervisor. The first user selects an interface element associated with the runbook session to display a list of operations remaining in the runbook session. For example, after the supervisor provisions a new node for use by the particular tenant, the runbook session may include an operation to transfer a subset of tenant data or applications to the new node.

Some operation results obtained based on the supervisor actions may be hidden from the first user based on the first user lacking a required authority level. For example, one operation may direct the supervisor to implement a new node for the tenant based on a confidential business requirement associated with the tenant. The first user may observe that the supervisor provisioned the new node without observing the analysis results associated with the confidential business requirement.

The first user completes the remaining runbook operations to complete the runbook (Operation 434). The runbook execution platform may store a copy of the results associated with the completed runbook session. The runbook execution platform may notify the supervisor when the runbook is completed. The runbook execution platform may remove the runbook session from a UI associated with the first user of pending runbook sessions.

While an embodiment is described above in which one user owns a runbook session at a time, according to an alternative embodiment, multiple users may be co-owners of the same runbook. For example, two users may simultaneously access a runbook session and perform operations of the runbook. The runbook execution interface may cause a particular operation to be un-selectable by one user when the system detects another user has the particular operation open for performing the operation.

According to another embodiment, a supervisor may supervise performance of a runbook session. For example, a first user may initiate a runbook session and begin performance of operations in the runbook session. A runbook execution platform may give a supervisor functionality to observe which operations have been completed by the first user, when the operations were completed, and the results of the completed operations. The runbook execution platform may further give the supervisor the ability to select one or more operations to perform. The supervisor may perform operations simultaneously with the first user performing operations in the same runbook. The runbook execution platform may include a function to generate notifications to interested entities of a progress of a runbook execution. For example, if a first user passes ownership of the runbook session to a second user, the runbook execution platform may provide notifications to the first user of a status of operations in the runbook session.

A runbook management system may be used to configure a runbook with one or more attributes that control authorization for runbook sessions based on the runbook. Runbook sessions and individual runbook operations may require a specific authorization to execute the runbook session or runbook operation. In other words, the runbook management system may be used to configure a runbook session such that a user has to, for example, enter certain credentials before the runbook session or runbook operation can be executed by the user. The user may have a profile that is configured with certain permissions that authorize the user to execute a first runbook but not a second runbook. Similarly, the user may have authorization for a first runbook operation but not a second runbook operation. A user may have the authorization to view results of a first runbook execution or a first runbook operation execution but not a second runbook execution or a second runbook operation execution.

The authorization for executing a runbook operation may be statically stored in association with the runbook operation. As an example, metadata associated with the runbook operation may identify a limited set of users or a permission level necessary to initiate execution of the runbook operation. Alternatively, or additionally, the authorization for executing a runbook operation may be determined as a function of data sets, metrics, and components associated with the runbook operation. If a user has permissions to access all of the data sets, metrics, and components associated with the runbook operation, then the user has permission to initiate the execution of the runbook operation.

In an embodiment, the runbook management system may be used to define a particular user as an owner of the runbook or runbook operations. While multiple users may have authorization for a runbook or runbook operations as described above, there may be a particular owner of a runbook (e.g., for a certain time period). Ownership of the runbook may be defined as a user's ability, for a defined time period, to execute a runbook or runbook operations, delegate execution of the runbook or runbook operations, view results of runbook or runbook operation execution, and/or transfer ownership of the runbook to another user. The runbook management system may be configured to exclude users apart from the runbook owner from performing some or all of the abovementioned actions for a defined time period. The owner user may retain ownership of a runbook while delegating execution of one or more operations of the runbook to another user.

According to one or more embodiments, transferring ownership of a runbook session includes storing state information associated with execution of the runbook session at a point-in-time when the runbook is being transferred. The state information includes one or more of: an execution status of at least one operation of the runbook session or results of the at least one operation of the runbook session. Transferring the ownership of the runbook session includes transferring the runbook session and the state information associated with executing the runbook session.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
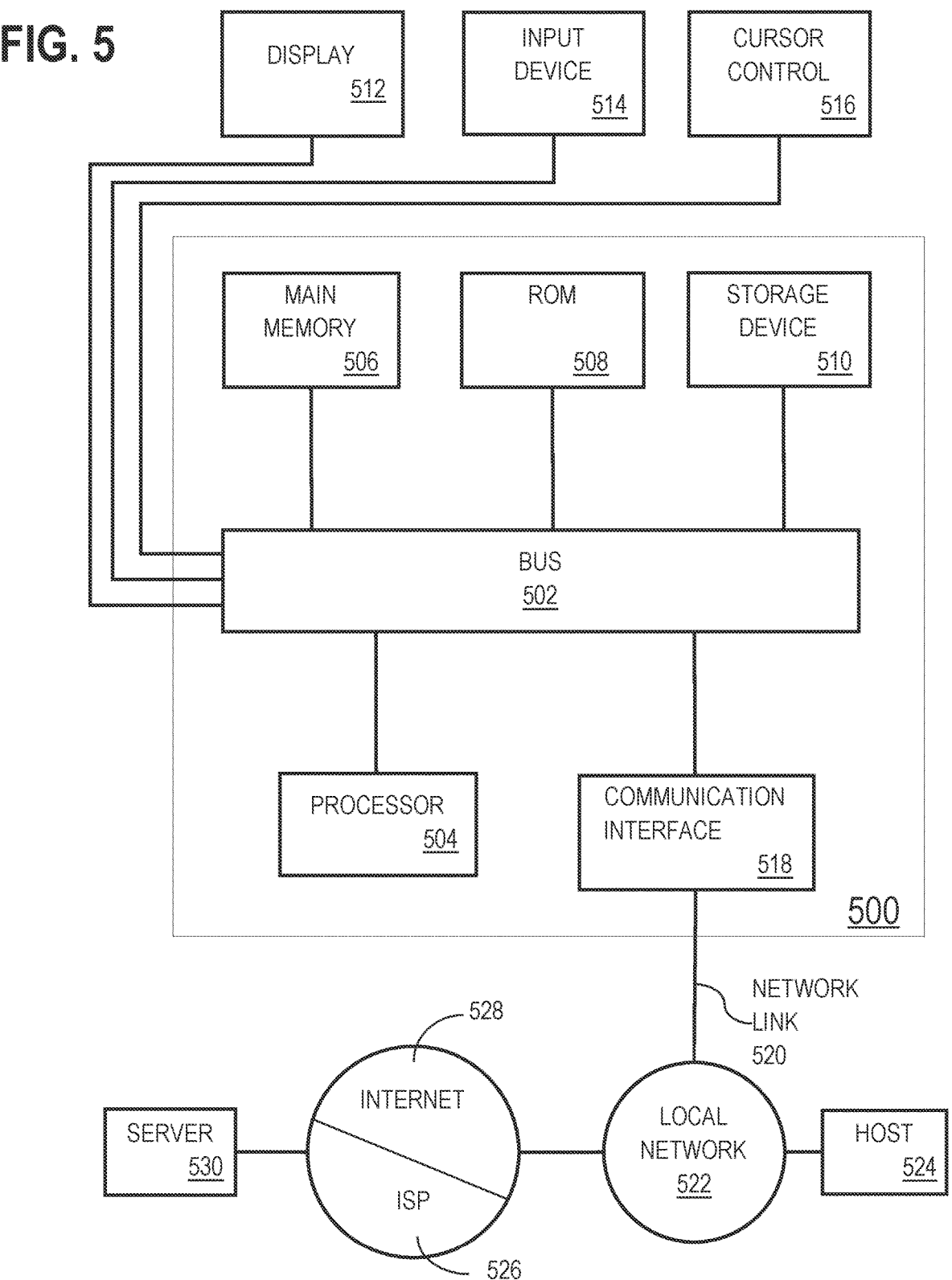
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    detecting, by a runbook execution engine, an occurrence of an event associated with a monitored system;
    initiating by a first instance of the runbook execution engine executing on a first computing device, a runbook session for executing a set of operations specified in a runbook for remediating the event;
    presenting, by the first instance of the runbook execution engine to a first entity accessing the first computing device, a runbook execution interface for executing one or more operations among the set of operations specified in the runbook;
    receiving, by the first instance of the runbook execution engine executing on the first computing device, a first set of results corresponding to executing a first runbook operation specified in the runbook by the first entity;
    detecting, by the first instance of the runbook execution engine, a trigger to identify an alternate entity to perform a second operation of the runbook, wherein detecting the trigger comprises:
        analyzing runbook metadata stored with the first runbook to determine the first entity is prevented from performing the second operation among the set of operations specified in the runbook;
    based on detecting the trigger:
        analyzing, by the first instance of the runbook execution engine executing on the first computing device, the runbook metadata stored in association with the second operation of the runbook to identify a second entity that is permitted to perform the second operation of specified in the runbook;
        storing, by the first instance of the runbook execution engine, state information associated with execution of the runbook session at a point-in-time subsequent to receiving the first set of results, the state information comprising one or more of: an execution status of the one or more operations among the set of operations specified in the runbook or the first set of results of the first operation;
        transmitting, by the first instance of the runbook execution engine, the state information associated with executing the runbook session to a second instance of the runbook execution engine running on a second computing device;
        and
        based on transmitting the state information to the second instance of the runbook execution engine:
            presenting, by the second instance of the runbook execution engine executing on the second computing device, first information to the second entity necessary to perform the second operation of the runbook session;
    receiving, by the second instance of the runbook execution engine running on the second computing device, a second set of results corresponding to executing the second runbook operation by the second entity; and updating, by the second instance of the runbook execution engine executing on the second computing device, the state information associated with executing the runbook session to indicate completion of the second operation by the second entity based at least upon receiving the second set of results, wherein the runbook execution engine stores authorization data specifying authority for at least one of the first entity and the second entity associated with at least one of the first set of results and the second set of results, and wherein the operations further comprise at least one of:
  a first set of operations comprising:
    restricting the second entity from performing a third operation associated with the first set of results based on determining, from the authorization data, that the second entity does not have the authority to perform the third operation;
    transmitting the state data, updated by the second instance of the runbook execution engine, to the first instance of the runbook execution engine; and
    based on receiving the state data updated by the second instance of the runbook execution engine, presenting, by the first instance of the runbook execution engine, second information to the first entity necessary to perform the third operation, and
  a second set of operations comprising:
    restricting the first entity from performing a fourth operation associated with the second set of results based on determining, from the authorization data, that the first entity does not have the authority to perform the fourth operation.

2. The non-transitory computer readable medium of claim 1, wherein the first entity is an owner of the runbook session authorized to modify and close the runbook session, and
  wherein transmitting the state information associated with execution of the runbook session includes storing ownership data specifying that the first entity retains ownership of the runbook session while the runbook session executes on the second instance of the runbook execution engine.

3. The non-transitory computer readable medium of claim 1, wherein the authorization data specifies that the first entity has authority to access both the first set of results and the second set of results, and that the second entity does not have authority to access the first set of results.

4. The non-transitory computer readable medium of claim 1, wherein the trigger comprises:
  determining, based on the metadata, that the first entity is not authorized to perform the second operation,
  wherein the operations further comprise identifying the second entity to perform the second operation of the runbook session based on determining, based on the metadata, the second entity is authorized to perform the second operation.

5. The non-transitory computer readable medium of claim 1, wherein the first entity executes the first operation of the runbook session based on the first entity being an owner of the runbook session,
  wherein the operations further comprise:
    transferring ownership of the runbook session from the first entity to the second entity, wherein the second entity executes the second operation of the runbook session based on the second entity being the owner of the runbook session, wherein the operations further comprise:
  re-transferring ownership of the runbook session from the second entity to the first entity; and
  subsequent to re-transferring ownership of the runbook session from the second entity to the first entity:
    executing, by the first entity, the third operation of the runbook session to generate a third set of results.

6. The non-transitory computer readable medium of claim 1, wherein providing to the second entity the first information necessary to perform the second operation of the runbook session includes generating a service ticket in a service ticket platform,
  wherein executing, by the second entity, the second operation of the runbook session to generate the second set of results includes performing, by the second entity, actions specified by the service ticket of the service ticket platform.

7. The non-transitory computer readable medium of claim 1, wherein providing to the second entity the first information necessary to perform the second operation of the runbook session comprises:
  generating, by the second instance of the runbook execution engine executing on the second computing device, a user interface element associated with the second operation, and
  wherein executing, by the second entity, the second operation of the runbook session comprises:
    receiving, by the second instance of the runbook execution engine, an input from the second entity selecting the user interface element; and
    in response to receiving the input from the second entity, displaying, by the second instance of the runbook execution engine, the first information necessary to perform the second operation.

8. The non-transitory computer readable medium of claim 1, wherein receiving, by the second instance of the runbook execution engine, the second set of results comprises:
  monitoring, by the second instance of the runbook execution engine executing on the second computing device, an application associated with the second operation to detect execution of the second operation; and
  based on detecting, by the second instance of the runbook execution engine, execution of the second operation by the second entity:
    notifying the first entity of the execution of the second operation by the second entity.

9. The non-transitory computer readable medium of claim 8, wherein notifying the first entity of the execution of the second operation by the second entity includes presenting the second set of results to the first entity.

10. A method comprising:
  detecting, by a runbook execution engine, an occurrence of an event associated with a monitored system;
  initiating by a first instance of the runbook execution engine executing on a first computing device, a runbook session for executing a set of operations specified in a runbook for remediating the event;
  presenting, by the first instance of the runbook execution engine to a first entity accessing the first computing device, a runbook execution interface for executing one or more operations among the set of operations specified in the runbook;
  receiving, by the first instance of the runbook execution engine executing on the first computing device, a first set of results corresponding to executing a first runbook operation specified in the runbook by the first entity;

detecting, by the first instance of the runbook execution engine, a trigger to identify an alternate entity to perform a second operation of the runbook, wherein detecting the trigger comprises:
  analyzing runbook metadata stored with the first runbook to determine the first entity is prevented from performing the second operation among the set of operations specified in the runbook;

based on detecting the trigger:
  analyzing, by the first instance of the runbook execution engine executing on the first computing device, the runbook metadata stored in association with the second operation of the runbook to identify a second entity that is permitted to perform the second operation of specified in the runbook;
  storing, by the first instance of the runbook execution engine, state information associated with execution of the runbook session at a point-in-time subsequent to receiving the first set of results, the state information comprising one or more of: an execution status of the one or more operations among the set of operations specified in the runbook session or the first set of results of the first operation;
  transmitting, by the first instance of the runbook execution engine, the state information associated with executing the runbook session to a second instance of the runbook execution engine running on a second computing device; and
  based on transmitting the state information to the second instance of the runbook execution engine:
    presenting, by the second instance of the runbook execution engine executing on the second computing device, first information to the second entity necessary to perform the second operation of the runbook session;

receiving, by the second instance of the runbook execution engine running on the second computing device, a second set of results corresponding to executing the second runbook operation by the second entity; and updating, by the second instance of the runbook execution engine executing on the second computing device, the state information associated with executing the runbook session to indicate completion of the second operation by the second entity based at least upon receiving the second set of results, wherein the runbook execution engine stores authorization data specifying authority for at least one of the first entity and the second entity associated with at least one of the first set of results and the second set of results, and wherein the operations further comprise at least one of:
  a first set of operations comprising:
    restricting the second entity from performing a third operation associated with the first set of results based on determining, from the authorization data, that the second entity does not have the authority to perform the third operation;
    transmitting the state data, updated by the second instance of the runbook execution engine, to the first instance of the runbook execution engine; and
    based on receiving the state data updated by the second instance of the runbook execution engine, presenting, by the first instance of the runbook execution engine, second information to the first entity necessary to perform the third operation, and a second set of operations comprising:
    restricting the first entity from performing a fourth operation associated with the second set of results based on determining, from the authorization data, that the first entity does not have the authority to perform the fourth operation.

11. The method of claim 10, wherein the first entity is an owner of the runbook session authorized to modify and close the runbook session, and
  wherein transmitting the state information associated with execution of the runbook session includes storing ownership data specifying that the first entity retains ownership of the runbook session while the runbook session executes on the second instance of the runbook execution engine.

12. The method of claim 10, wherein the authorization data specifies that the first entity has authority to access both the first set of results and the second set of results, and that the second entity does not have authority to access the first set of results.

13. The method of claim 10, wherein the trigger comprises:
  determining, based on the metadata, that the first entity is not authorized to perform the second operation,
  wherein the method further comprises identifying the second entity to perform the second operation of the runbook session based on determining, based on the metadata, the second entity is authorized to perform the second operation.

14. The method of claim 10, wherein the first entity executes the first operation of the runbook session based on the first entity being an owner of the runbook session, wherein the operations further comprise:
  transferring ownership of the runbook session from the first entity to the second entity,
  wherein the second entity executes the second operation of the runbook session based on the second entity being the owner of the runbook session,
  wherein the operations further comprise:
    re-transferring ownership of the runbook session from the second entity to the first entity; and
    subsequent to re-transferring ownership of the runbook session from the second entity to the first entity:
      executing, by the first entity, the third operation of the runbook session to generate a third set of results.

15. The method of claim 10, wherein providing to the second entity the first information necessary to perform the second operation of the runbook session includes generating a service ticket in a service ticket platform,
  wherein executing, by the second entity, the second operation of the runbook session to generate the second set of results includes performing, by the second entity, actions specified by the service ticket of the service ticket platform.

16. The method of claim 10, wherein providing to the second entity the first information necessary to perform the second operation of the runbook session comprises:
  generating, by the second instance of the runbook execution engine executing on the second computing device, a user interface element associated with the second operation, and
  wherein executing, by the second entity, the second operation of the runbook session comprises:
    receiving, by the second instance of the runbook execution engine, an input from the second entity selecting the user interface element; and in response to receiving the input from the second entity, displaying, by the second instance of the runbook execution engine, the first information necessary to perform the second operation.

17. The method of claim 10, wherein receiving, by the second instance of the runbook execution engine, the second set of results comprises:
monitoring, by the second instance of the runbook execution engine executing on the second computing device, an application associated with the second operation to detect execution of the second operation; and
based on detecting, by the second instance of the runbook execution engine, execution of the second operation by the second entity:
notifying the first entity of the execution of the second operation by the second entity.

18. A system comprising:
one or more processors; and
memory storing instructions that, when executed by the one or more processors, cause the system to perform operations comprising:
detecting, by a runbook execution engine, an occurrence of an event associated with a monitored system;
initiating by a first instance of the runbook execution engine executing on a first computing device, a runbook session for executing a set of operations specified in a runbook for remediating the event;
presenting, by the first instance of the runbook execution engine to a first entity accessing the first computing device, a runbook execution interface for executing one or more operations among the set of operations specified in the runbook;
receiving, by the first instance of the runbook execution engine executing on the first computing device, a first set of results corresponding to executing a first runbook operation specified in the runbook by the first entity;
detecting, by the first instance of the runbook execution engine, a trigger to identify an alternate entity to perform a second operation of the runbook, wherein detecting the trigger comprises:
analyzing runbook metadata stored with the first runbook to determine the first entity is prevented from performing the second operation among the set of operations specified in the runbook;
based on detecting the trigger:
analyzing, by the first instance of the runbook execution engine executing on the first computing device, the runbook metadata stored in association with the second operation of the runbook to identify a second entity that is permitted to perform the second operation specified in the runbook;
storing, by the first instance of the runbook execution engine, state information associated with execution of the runbook session at a point-in-time subsequent to receiving the first set of results, the state information comprising one or more of: an execution status of the one or more operations among the set of operations specified in the runbook or the first set of results of the first operation;
transmitting, by the first instance of the runbook execution engine, the state information associated with executing the runbook session to a second instance of the runbook execution engine running on a second computing device;
and
based on transmitting the state information to the second instance of the runbook execution engine:
presenting, by the second instance of the runbook execution engine executing on the second computing device, first information to the second entity necessary to perform the second operation of the runbook session;
receiving, by the second instance of the runbook execution engine running on the second computing device, a second set of results corresponding to executing the second runbook operation by the second entity; and
updating, by the second instance of the runbook execution engine executing on the second computing device, the state information associated with executing the runbook session to indicate completion of the second operation by the second entity based at least upon receiving the second set of results,
wherein the runbook execution engine stores authorization data specifying authority for at least one of the first entity and the second entity associated with at least one of the first set of results and the second set of results, and
wherein the operations further comprise at least one of:
a first set of operations comprising:
restricting the second entity from performing a third operation associated with the first set of results based on determining, from the authorization data, that the second entity does not have the authority to perform the third operation;
transmitting the state data, updated by the second instance of the runbook execution engine, to the first instance of the runbook execution engine; and
based on receiving the state data updated by the second instance of the runbook execution engine, presenting, by the first instance of the runbook execution engine, second information to the first entity necessary to perform the third operation, and
a second set of operations comprising:
restricting the first entity from performing a fourth operation associated with the second set of results based on determining, from the authorization data, that the first entity does not have the authority to perform the fourth operation.

* * * * *